US005225657A

United States Patent [19]

Blankenship

[11] Patent Number: 5,225,657

[45] Date of Patent: Jul. 6, 1993

[54] PLASMA-ARC TORCH SYSTEM WITH FILTER

[75] Inventor: George D. Blankenship, Chardon, Ohio

[73] Assignee: The Lincoln Electric Company, Cleveland, Ohio

[21] Appl. No.: 822,148

[22] Filed: Jan. 17, 1992

[51] Int. Cl.[5] ............ B23K 9/00

[52] U.S. Cl. ............ 219/121.48; 219/121.55; 219/121.51; 219/75; 219/121.54; 219/121.39

[58] Field of Search ............ 219/121.5, 121.51, 121.55, 219/121.54, 74, 75, 121.48, 121.39

[56] References Cited

U.S. PATENT DOCUMENTS

| | | | |
|---|---|---|---|
| 3,988,566 | 10/1976 | Vogts et al. | 219/121.48 |
| 4,039,798 | 8/1977 | Lythall et al. | 219/121.5 |
| 4,795,880 | 1/1989 | Hayes et al. | 219/121.52 |
| 4,845,334 | 7/1989 | Stocks et al. | 219/121.59 |
| 4,916,283 | 4/1990 | Nagasaka et al. | 219/121.51 |

*Primary Examiner*—Mark H. Paschall

*Attorney, Agent, or Firm*—Body, Vickers & Daniels

[57] ABSTRACT

A plasma-arc torch system is disclosed wherein a source provides gas and electrical power. A delivery device is connected to the source for supplying the gas and electrical power to a plasma-arc torch. A filter is disposed within the delivery device for filtering the gas being supplied to the plasma-arc torch. The filter provides more uniform operation and improved gas mixing.

22 Claims, 3 Drawing Sheets

PLASMA-ARC TORCH SYSTEM WITH FILTER

The present invention relates to filtering gas delivered to a plasma-arc torch conduit and more particularly to a plasma-arc torch conduit having a plasma-arc torch at one end and a releasable connector at an opposite end. The present invention is particularly applicable for use in a portable plasma-arc torch system where a flexible conduit having the torch at one end is plugged into a portable apparatus providing electrical power and gas. In such a system, care is needed to prevent dirt from being trapped in the gas lines to the torch causing the torch to malfunction and will be particularly described with particular reference thereto; however, the invention has much broader applications and may be used in various other plasma-arc torch systems where filtered gas is required for improved operation of the torch.

BACKGROUND OF THE INVENTION

Plasma-arc torches are commonly used for cutting, welding and spray bonding of workpieces and are operated by directing a plasma consisting of ionized gas particles toward a workpiece. In the operation of a typical plasma-arc torch, a gas to be ionized is supplied to the front end of the plasma-arc torch and channelled between a pair of electrodes before exiting through an orifice in the torch tip. One electrode, which is at a relatively negative potential, is usually referred to as the "cathode" or simply as the "electrode". The torch tip, which is adjacent to the end of the "electrode" at the front end of the torch, constitutes the relatively positive potential electrode or "anode".

When a sufficiently high voltage is applied, an arc is caused to jump the gap between the electrode and the torch tip, thereby heating the gas and causing it to ionize. A pilot, pulsating voltage between the electrode and the torch tip maintains an arc known as the pilot, or non-transferred appears as a flame that extends externally from the torch tip. Subsequently, during the transferred arc operation, the workpiece serves as the anode. This occurs as the torch head is moved closer to the workpiece and the arc jumps or transfers between the electrode and the workpiece, since the impedance of the workpiece current path is lower than the impedance of the torch tip current path.

In portable systems, as illustrated in FIG. 1 of the instant specification, it is advantageous to replace the combined flexible cable or conduit with a plasma torch at one end with a substitute combined flexible conduit and torch. This enables an operator to quickly and easily exchange torches whenever different operating characteristics are required or a torch requires repair or replacement. In view of the high temperatures and adverse operating condition to which the plasma-arc torches are exposed, the exchange or replacement of the plasma-arc torches is required on a regular basis.

During the replacement, i.e. when the flexible conduit is disconnected from the portable unit, there is a danger of dirt being collected and trapped in the gas lines to the torch. This dirt can clog the passageways in the torch and cause a malfunction of the torch. Since the portable plasma-arc torches are typically used in dirty, industrial environments, a means of preventing dirt and debris from entering the gas lines to the torch became necessary.

SUMMARY OF THE INVENTION

The present invention relates to the filtering of gas into the plasma-arc torch system to prevent clogging of the gas lines and torch nozzle during operation.

Accordingly, it is a principal object of the present invention to provide an improved plasma-arc torch system wherein filtered gas is supplied to the plasma-arc torch whereby the likelihood of torch malfunctioning due to clogging from dirt is substantially reduced.

This object along with other features of the invention can be achieved in a plasma-arc torch system constructed of a source assembly for providing gas, a delivery system connected to the source for supplying gas to the plasma-arc torch and a gas filter in the delivery system for filtering the gas supplied to the plasma-arc torch.

In accordance with a more specific feature of the present invention, the delivery system includes a torch connector housing attached to the source assembly. The torch connector housing includes the gas filter therein. The filter preferably includes a filter casing having a gas inlet for receiving gas from the source assembly and a gas outlet for delivering gas to the plasma-arc torch. A filter element received within the filter casing filters the gas flowing from the gas inlet to the gas outlet. Preferably, the filter element is disposable and removably inserted within the filter casing in order that it can be readily replaced. Typically, all of the gas flowing from the source to the plasma-arc torch is channelled through the filter.

In accordance with still yet another more specific aspect of the present invention, the source assembly also provides electrical power which is transferred through the delivery apparatus to the plasma-arc torch. More specifically, the electrical power is delivered via an electrical circuit which includes the casing of the filter.

In accordance with still yet another more specific aspect of the present invention, the delivery system includes a torch connector housing connected by a torch inlet assembly at one end to the source assembly and at the other end to a flexible hose or conduit having the plasma-arc torch attached thereto. The torch inlet assembly includes a male connector plug removably received within a female receptacle attached to the source assembly. In the connected condition, gas and electrical power are transferred from the source assembly to the delivery system and finally to the plasma-arc torch via the flexible conduit.

In accordance with another feature of the present invention, the gas filter is an integral part of the connector housing.

In accordance with a still more specific aspect of the present invention, the male connector plug and the female receptacle form a quick disconnect coupling.

It is a further object of the present invention to provide a plasma-arc torch system which obviates the deficiencies and failings of the prior art systems.

It is a further object of the present invention to provide a plasma-arc torch system which filters all of the gas being delivered to the plasma-arc torch.

It is a yet further object of the present invention to provide a plasma-arc torch system having a filter device which functions to both filter gas being delivered to the plasma-arc torch as well as being a portion of the electrical circuit for delivering electrical power to the torch.

It is a still further object of the present invention to provide a plasma-arc torch system wherein a flexible hose or conduit having the plasma-arc torch at one end is connected to the delivery system by means of a quick disconnect coupling.

Still a further object of the present invention is to provide a plasma-arc torch system wherein the filter for the gas is replaceable.

Still a further object of the present invention is to provide a plasma-arc torch system which is simple, economic and functionally improved over prior plasma-arc torch systems.

These and other objects and advantages will become apparent from the following description taken together with the accompanying drawings.

PREFERRED EMBODIMENT

Figure 1:
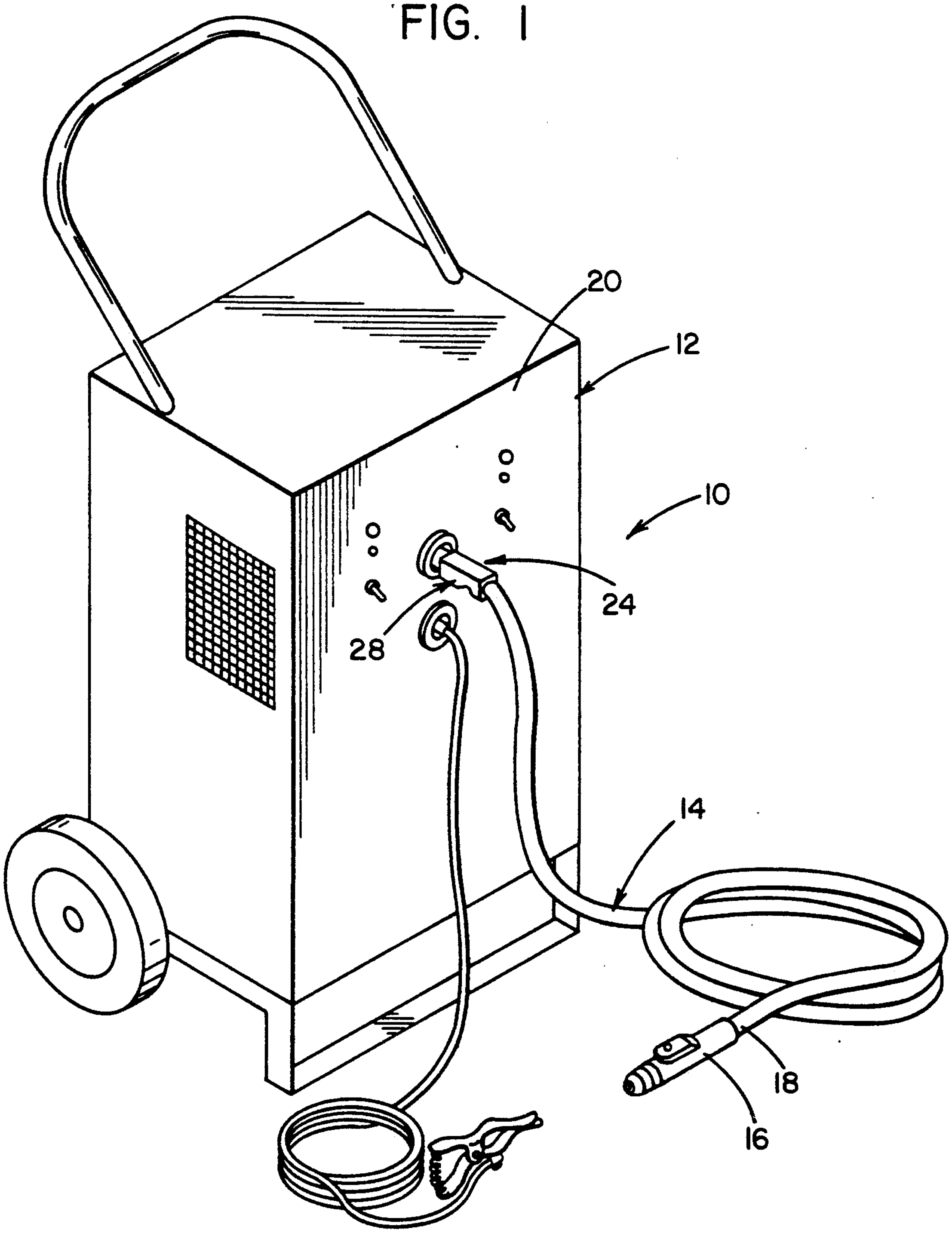
FIG. 1 is a perspective view of a plasma-arc torch system including a portable gas and power source having a detachable flexible hose with a plasma-arc torch connected thereto.

Referring now to the drawings, wherein the showings are for the purpose of illustrating the preferred embodiment of the invention only, and not for the purpose of limiting the invention, FIG. 1 shows a plasma-arc torch system 10 incorporating a portable gas and power source 12 and a flexible hose or conduit 14 with a plasma-arc torch 16 at one end 18.

Figure 2:
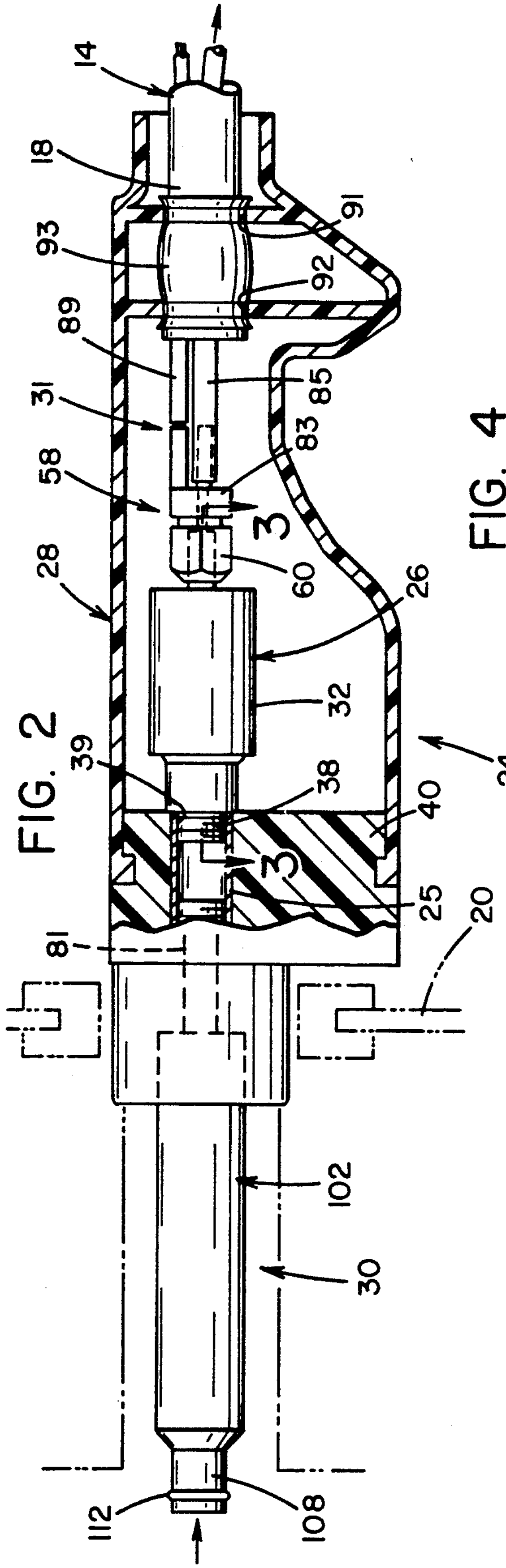
FIG. 2 is a side view, partly in section, of a torch connector housing having a filter and connector plug in accordance with the preferred embodiment of the present invention.
Figure 5:
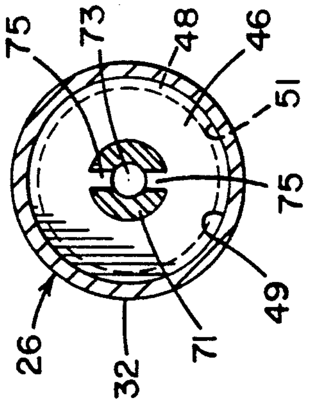
FIG. 5 is a view through 5—5 of FIG. 3.
Figure 4:
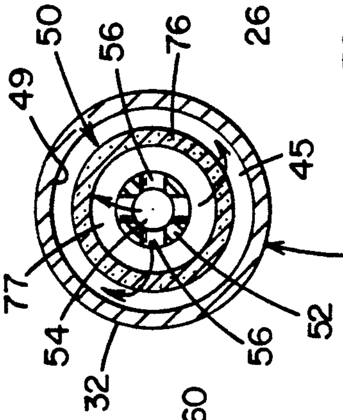
FIG. 4 is a view through 4—4 of FIG. 3.
Figure 3:
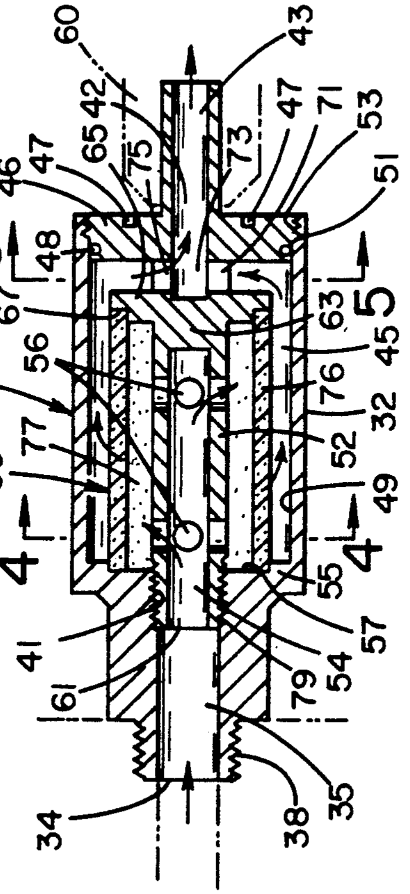
FIG. 3 is a plan view, in section, through 3—3 of FIG. 2, of a filter in accordance with the preferred embodiment of the invention.

Referring specifically to FIGS. 1 and 2, housing 20 of the portable gas and power source 12 includes a source (not shown) for providing the gas and electrical power to the delivery system 24 for supplying the gas and power to the plasma-arc torch 16. A filter structure 26 is provided within the delivery system 24 for filtering gas being supplied by the source to the plasma-arc torch 16.

Referring specifically to the delivery system 24, as illustrated in FIG. 2, a torch connector housing 28 includes the filter 26, a torch inlet assembly 30 and a torch outlet assembly 31. The inlet assembly 30 forms a part of a quick-disconnect coupling illustrated in FIG. 6 and discussed hereinafter. The torch outlet assembly 31 includes gas and electrical connectors for conducting gas and electrical power to the flexible conduit 14 whereby gas and electrical power can be delivered to the plasma-arc torch 16.

Referring specifically to the filter 26, as seen in FIGS. 2, 3, 4 and 5, a filter casing 32 is provided with a gas inlet 34 having an inlet passageway 35 for receiving gas from the gas source. The casing 32 can be provided with a conventional threaded neck portion 38 which can be threadedly connected to a threaded aperture 39 in a metal bushing 25 secured within housing support 40. The filter casing 32 further includes a gas outlet 42 having an outlet passageway 43 for delivering gas to the torch outlet assembly 31. The gas outlet 42 can be attached by conventional means, such as a connector nut 60, to the gas and electrical connectors of torch outlet assembly 31. Further, the gas outlet 42 can be integrally attached to a removable outlet plate 46 which is sealed within the casing 32 by any means such as a seal ring 48. If desired, the outlet plate 46 can be threadedly attached to casing 32 and provided with slots 47 to receive a tool for attaching or removing plate 46 from casing 32. The gas inlet passageway 35 of the casing 32 can be provided with an internal threaded end section 41 at one end thereof. The threaded end section is adapted to have threadedly attached thereto a removable filter element 50 as discussed hereinafter. In the preferred embodiment, filter 26 is an integral part of connector nut 60, such that this filter structure and connector nut form one piece. The one piece unit simplifies the insertion of filter casing 32 between gas inlet opening 61 to output gas line 85 by eliminating outlet plate 46 and seal ring 48 and reduces gas leakage which may escape through seal ring 48. The casing 32 further includes a filter receiving cavity 45. In the preferred embodiment, the filter receiving cavity 45 is a substantially cylindrical bore 49 being open at one end 51 with a threaded end surface 53 and an opposite end wall 55 having the gas inlet passageway 35 extending therethrough. In addition, a groove 57, preferably cylindrical, can be provided in the end wall 55 of the cavity 45. The groove 57 is adapted to receive an end of the filter element 50, as discussed herein.

Referring specifically to the filter element in the preferred embodiment, it can be a disposable or replaceable filter element 50. The element 50 can be provided with a substantially cylindrical structural element 52 having a central passageway 54. The passageway 54 has an inlet opening 61 in one end and is blocked at a second end by a closure wall 63. A plurality of apertures 56 extending through the cylindrical structural element 52 provide a flow path from the passageway 54 to the space surrounding the element 52.

The closure wall 63 can have a cylindrical base 65 projecting outwardly from the structural element 52. The base 65 can be provided with a groove 67. The side of the wall 63 oppositely disposed from the structural element 52 has a cylindrical rod 71 with a central passageway 73 and apertures 75 providing communication between the cavity 45 and the passageway 73. The passageway 73 is in communication with passageway 43 of gas outlet 42.

A conventional cylindrical filtering material 76, such as a porous plastic, can be disposed about and spaced from the element 52 to form a doughnut shaped space 77. The filtering material 76 can be attached at one end by any conventional technique, such as an adhesive or a force fit, to the groove 67 formed on a cylindrically shaped outer end of closure wall 63. The other end of the filter can be received in the groove 57 of casing 32. The filter 50 can be removably connected to the threaded end section 41 of the filter housing by means of threads 79 formed about the inlet opening 61.

In operation, gas from source 12 enters the gas inlet passageway 34 of filter 26 and flows into the central passageway 54 of the structural element 52. The gas then flows through apertures 56, into the space 77 and across the filter material 76. The gas then flows across aperture 75 and into the gas outlet passageway 43. Note that in the preferred embodiment, all gas flowing into gas inlet passageway 35 passes through filter material 76. The size of the holes in filtering material 76 are sufficiently small to capture a majority of the dirt particles entering from gas inlet passageway 34, yet not so small so as to inhibit the gas flow through filtering material 76. The pores of filtering material 76 further function to mix the gases flowing between passageway 54 and cavity 45 by creating additional gas turbulence as the gases flow through filtering material 76.

Whereas a filter 26 including a disposal filter element 50 has been disclosed herein, it is also within the terms of the present invention to replace filter 26 with any other type of conventional filter suitable for filtering gas used in operating plasma torches.

Another aspect of the preferred embodiment is that the delivery system 24 can provide electrical power as well as gas to plasma-arc torch 16. Therefore, the system 24 preferably includes a carrier of electrical current which delivers the electrical power via inlet assembly 30, the filter casing 32, the outlet assembly 31 and the flexible conduit 14 to the plasma-arc torch 16.

The carrier of electrical current includes the torch inlet assembly 30. The carrier of electrical current further includes conduit 81 attaching the inlet assembly 30 to the filter casing 32, the connector nut assembly 58 and the power line 89.

As seen in FIG. 2, the connector nut assembly 58 can include a connector nut 60 which attaches a gas and electrical connector 83 to output gas line 85 and electric power line 89 which are encased in the flexible hose 14.

The torch connector housing 28 further includes an outlet aperture 91 and an inner aperture 92 spaced from the outlet aperture 91. An insulator sleeve 93 is disposed between apertures 91 and 92. The insulator sleeve receives one end 18 of the flexible conduit 14 which is connected at the other end to the plasma-arc torch 16.

The torch inlet assembly 30 is attached at one end to the filter 32 by any means such as conduit 81. The conduit 81 can be threadedly received within a metal bushing 25 disposed in the support 40. The torch inlet assembly 30 includes a quick disconnect coupling 100 which can include a male connector plug 102 received in a female connector receptacle 104, as seen in FIG. 6.

Figure 6:
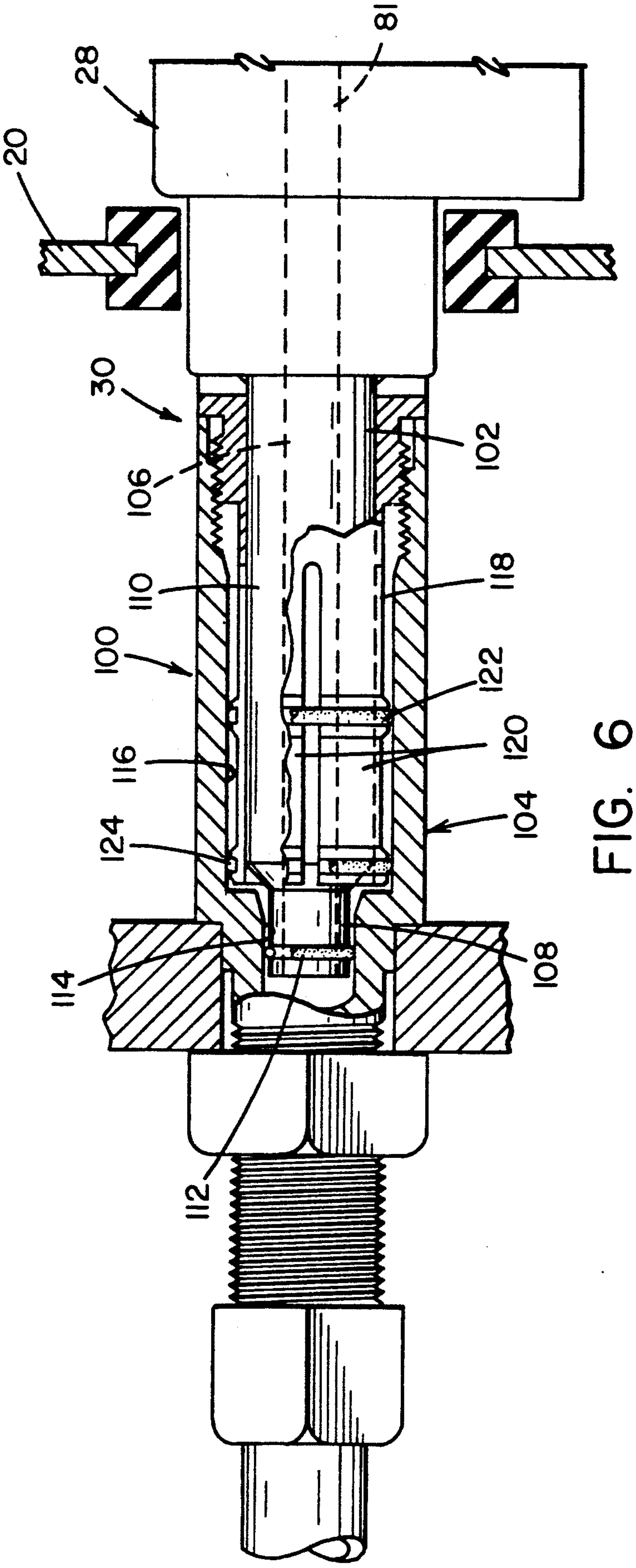
FIG. 6 is a sectional, side elevation view of the male connector plug attached in the female receptacle in accordance with the invention.

Referring to FIG. 6, there are illustrated the details of a quick disconnect coupling 100 in the assembled condition. The male connector plug 102 has a bore 106 therethrough. The inlet section 108 of the male plug 102 has a smaller outer diameter than the outer diameter of the main body section 110. Further, the inlet section 108 can include a seal ring 112 for sealing the inlet section 108 in the upstream bore 114 of the female connector receptacle 104 to prevent leakage of gas flowing therethrough.

The female connector receptacle 104 includes an upstream bore 114 and a downstream bore 116. The downstream bore 116 receives the main body section 110 of the male connector plug 102 and a collet 118 for securing the male connector plug in the female receptacle. The collet 118 includes four fingers 120 having O-rings 122 and 124 in spaced axial relationship along the outer surface of the fingers 120. As the male connector plug 102 is inserted into the collet 118, the outer surface of the plug 102 presses against the inner surface of the collet and forces the fingers against the surface of the bore 116. The resulting compression of the O-rings 122 and 124 against the surface of bore 116 causes the collet fingers to tightly grip the male plug 102 and thereby achieve a tight electrical connection between the female receptacle and the male plug.

Although the quick disconnect coupling 100 is illustrated with the male plug being connected to the filter and the female receptacle to the source of gas and electrical power, it is within the terms of the present invention to reverse their position so that the male plug is connected to the source of gas and electrical power and the female receptacle is directly connected to the filter.

When the quick disconnect coupling 100 is coupled, as illustrated in FIG. 6, gas and electrical power are transmitted from the source of gas and electrical power 12 and into the delivery system 24. Within the delivery system 24, the gas can flow through the metal bushing 25, the filter 26 and into the input gas line 85 for delivery to the torch 16 through the flexible conduit 14. Also, electrical current can be directed from the disconnect coupling to the bushing 25, through the filter casing 26 and into the electric line 89 for conduction through the flexible conduit to the torch.

Whenever the torch 16 requires replacement, the male connector plug 102 is simply pulled out of the female receptacle 104 and the torch, hose and delivery system 24 are replaced with a different torch, hose and delivery system. Any dirt which gets into the system during this procedure is filtered out by the filter 26. During regular operation, it is recommended to replace the filter element 50 on a scheduled basis.

The invention has been described with reference to a preferred embodiment and it is apparent that many modifications may be incorporated into the design of the plasma-arc torch discussed herein without departing from the sphere or essence of the invention. It is my intention to include all such modifications and alterations insofar as they come within the scope of my invention. It is thus the essence of my invention to provide a plasma-arc torch system which can be readily adapted and configured to be incorporated in a wide variety of applications.

Wherefore, it is claimed:

1. A plasma-arc torch system, comprising:

delivery means connected to said source means for supplying said gas to an inlet to a plasma-arc torch, and filter means contained within said delivery means for filtering and mixing substantially all said gas prior to said gas entering said inlet to said plasma-arc torch;

said delivery means includes a torch connector housing attached to said source means, said torch connector housing having said filter means therein;

said filter means includes a filter casing, said filter casing comprising:

a gas inlet receiving gas from said source means, a gas outlet delivering filtered gas to said plasma-arc torch, and a filter element within said casing for filtering gas flowing from said gas inlet to said gas outlet;

said source means includes means for providing electrical power, and said delivery means includes electric carrier means connected to said source means for transferring said electrical power to said plasma-arc torch;

said electric carrier means includes said filter casing, said filter casing being an electrical conductor for transferring electrical power.

2. The plasma-arc torch system as defined in claim 1 wherein said filter element is removably inserted within said filter casing.

3. The plasma-arc torch system as defined in claim 1 wherein said filter means being integrally connected to said torch housing.

4. The plasma-arc torch system as defined in claim 1 wherein said filter element comprises small pores for trapping a majority of the non-gas particles entering into said filtering means.

5. The plasma-arc torch system as defined in claim 4 wherein said filter element pores are large enough to allow a generally uninhibited gas flow through said filter element.

6. The plasma-arc torch system as defined in claim 5 wherein said filter means provides additional mixing of said gases.

7. A plasma-arc torch system, comprising:

source means for providing gas, delivery means connected to said source means for supplying said gas to an inlet to a plasma-arc torch, and filter means contained within said delivery means for filtering and mixing substantially all said gas prior to said gas entering said inlet to said plasma-arc torch;

delivery means connected to said source means for supplying said gas to an inlet to a plasma-arc torch, and filter means contained within said delivery means for filtering and mixing substantially all said gas prior to said gas entering said inlet to said plasma-arc torch;

said delivery means includes a torch connector housing attached to said source means, said torch connector housing having said filter means therein;

said filter means includes a filter casing, said filter casing comprising:

a gas inlet receiving gas from said source means, a gas outlet delivering filtered gas to said plasma-arc torch, and a filter element within said casing for filtering gas flowing from said gas inlet to said gas outlet;

said source means includes means for providing electrical power, and said delivery means includes electric carrier means connected to said source means for transferring said electrical power to said plasma-arc torch;

said electric carrier means includes said filter casing, said filter casing being an electrical conductor for transferring electrical power.

8. The plasma-arc torch system as defined in claim 7 wherein said delivery means further includes a flexible hose connected to the torch outlet assembly at one end and to the plasma-arc torch at the opposite end, said flexible hose providing a flow path for the gas and an electrical carrier for the electrical power whereby gas and electrical power can be transferred from said source means to said plasma-arc torch.

9. The plasma-arc torch system as defined in claim 8 wherein said torch inlet assembly includes a male connector plug fixedly attached to said connector housing and a female connector receptacle fixedly attached to said source means whereby said male connector plug is removably received within said female receptacle for transferring said gas and electrical power to said plasma-arc torch.

10. The plasma-arc torch system as defined in claim 9 wherein said connector plug and said connector receptacle form a quick disconnect coupling.

11. The plasma-arc torch system as defined in claim 10 wherein said connector housing includes an aperture for supportably receiving said flexible hose.

12. A plasma-arc torch system comprising:

source means for providing gas and electrical power;

delivery means connected to said source means for supplying said gas and for conducting electrical power to an inlet to a plasma-arc torch; and electrically conductive filter means contained within said delivery means for both filtering and mixing substantially all said gas prior to said gas entering said inlet to said plasma-arc torch and conducting said electrical power flowing through said delivery means and into said inlet to said plasma-arc torch.

13. The plasma-arc torch system as defined in claim 12 wherein said filter means includes a casing having a filter element for filtering said gas, said casing further being part of an electrical circuit for conducting said electrical power.

14. The plasma-arc torch system as defined in claim 13 wherein said delivery means includes a torch connector housing, said torch connector housing includes a torch inlet assembly at one end being removably connected to said source means and a torch outlet assembly at a second end connected to said plasma-arc torch whereby gas and electrical power are transferred from said source means to said plasma-arc torch when the torch connector housing is connected to the source means.

15. The plasma-arc torch system as defined in claim 14 wherein said delivery means further includes a flexible hose connected to the torch outlet assembly at one end and to the plasma-arc torch at the other, opposite end, said flexible hose providing a flow path for the gas and an electrical carrier for the electrical power whereby gas and electrical power can be transferred from said source means to said plasma-arc torch.

16. The plasma-arc torch system as defined in claim 15 wherein said torch inlet assembly includes a male connector plug fixedly attached to said torch connector housing and a female connector receptacle fixedly attached to said source means whereby said male connector plug is removably received within said female receptacle for transferring said gas and electrical power to said plasma-arc torch.

17. The plasma-arc torch system as defined in claim 16 wherein said connector plug and said connector receptacle form a quick disconnect coupling.

18. The plasma-arc torch system as defined in claim 17 wherein said filter element is removably inserted within said casing.

19. The plasma-arc torch system as defined in claim 13 wherein said filter means being integrally connected to said torch housing.

20. The plasma-arc torch system as defined in claim 13 wherein said filter element comprises small pores for trapping a majority of the non-gas particles entering into said filtering means.

21. The plasma-arc torch system as defined in claim 20 wherein said filter element pores are large enough to allow a generally uninhibited gas flow through said filter element.

22. The plasma-arc torch system as defined in claim 21 wherein said filter means provides additional mixing of said gases.

* * * * *